Aug. 20, 1935.  A. SCHWARZ  2,011,986

INTERNAL COMBUSTION ENGINE AND METHOD OF OPERATION

Original Filed Jan. 19, 1932   8 Sheets-Sheet 1

Aug. 20, 1935. A. SCHWARZ 2,011,986
INTERNAL COMBUSTION ENGINE AND METHOD OF OPERATION
Original Filed Jan. 19, 1932   8 Sheets-Sheet 3

INVENTOR
*Alfred Schwarz*
BY
ATTORNEY

Aug. 20, 1935.    A. SCHWARZ    2,011,986
INTERNAL COMBUSTION ENGINE AND METHOD OF OPERATION
Original Filed Jan. 19, 1932    8 Sheets—Sheet 4

INVENTOR
*Alfred Schwarz*
BY
ATTORNEY

Aug. 20, 1935.   A. SCHWARZ   2,011,986
INTERNAL COMBUSTION ENGINE AND METHOD OF OPERATION
Original Filed Jan. 19, 1932   8 Sheets-Sheet 5

Fig. 11.

INVENTOR
Alfred Schwarz
BY
ATTORNEY

Aug. 20, 1935.  A. SCHWARZ  2,011,986
INTERNAL COMBUSTION ENGINE AND METHOD OF OPERATION
Original Filed Jan. 19, 1932    8 Sheets-Sheet 6

INVENTOR
Alfred Schwarz
BY
ATTORNEY

Aug. 20, 1935.  A. SCHWARZ  2,011,986
INTERNAL COMBUSTION ENGINE AND METHOD OF OPERATION
Original Filed Jan. 19, 1932  8 Sheets-Sheet 7

INVENTOR
Alfred Schwarz
BY
ATTORNEY

Aug. 20, 1935.  A. SCHWARZ  2,011,986
INTERNAL COMBUSTION ENGINE AND METHOD OF OPERATION
Original Filed Jan. 19, 1932   8 Sheets-Sheet 8

AIR INJECTION DURING
116° OF CRANK TRAVEL

INVENTOR
Alfred Schwarz
BY
ATTORNEY

Patented Aug. 20, 1935

2,011,986

UNITED STATES PATENT OFFICE 2,011,986

INTERNAL COMBUSTION ENGINE AND METHOD OF OPERATION

Alfred Schwarz, Upper Montclair, N. J., assignor to Fuel Oil Motors Corporation, New York, N. Y., a corporation of Delaware Application January 19, 1932, Serial No. 587,573
Renewed January 24, 1935

13 Claims. (Cl. 123—26)

My invention relates to internal combustion engines and more particularly has reference to methods of operating the same.

It is well known that internal combustion engines have a relatively low thermal efficiency. Approximately only one-quarter of the heat units is converted into power. It is also a fact that such engines have greatest efficiency at full load and that the efficiency is very much decreased when the engines are operated on throttle. This is due to the fact that in order to obtain good efficiency it is necessary to operate an engine on maximum compression, and when the throttle is applied the charge is taken in under a partial vacuum which necessarily reduces the compression, hence the poor efficiency. For example: An engine may operate on .8 lb. of fuel per H. P. hour at full load and may consume 3 lbs. of fuel per H. P. at ¼ load.

It is an object of the present invention to reduce the fuel consumption of engines at full load, as well as partial load, and also to increase the H. P. for a given displacement.

I have found that the fuel consumption and power development are not necessarily in direct relation to each other. For example: An engine may show considerable unburned fuel in its exhaust and yet may develop more power than a similar engine showing no waste in the exhaust. This is due to the fact that flame propagation is not in accordance with requirements of the piston speed, and under correct conditions there should be no waste in the exhaust gases, and flame propagation should take place exactly proportioned to the piston speed, neither too fast nor to slow, and it should also be controlled in proportion to the load of the engine, as will be explained hereinafter.

Heretofore, while certain influence was exercised over the flame propagation in the original design of the motor by means of ignition, cylinder head, design, etc. and also by means of certain chemical reagents mixed with the fuel, a real control over flame propagation was never obtained.

It is a further object of the present invention to place the control of the flame propagation into the hands of the operator, or else operate it by governors or similar devices.

I have found by experiment that the flame propagation cannot be controlled alone by the spark or other means of ignition, but that it is necessary to control the chemical composition of the charge, as well as the turbulence and by the use of more correct ignition time.

In the accompanying drawings, forming part of this application,

Figs. 1 to 4 are graphs bearing explanatory indicia and which will hereinafter be more particularly referred to;

Fig. 11 is a sectional view of a known type of engine which has been modified to carry out my invention while

Fig. 13 is a detail view in longitudinal section of the auxiliary air distributor valve for the engine of Figs. 11 and 12 while

Fig. 15 is a cross sectional view of the complete distributor valve while

Figure 1:
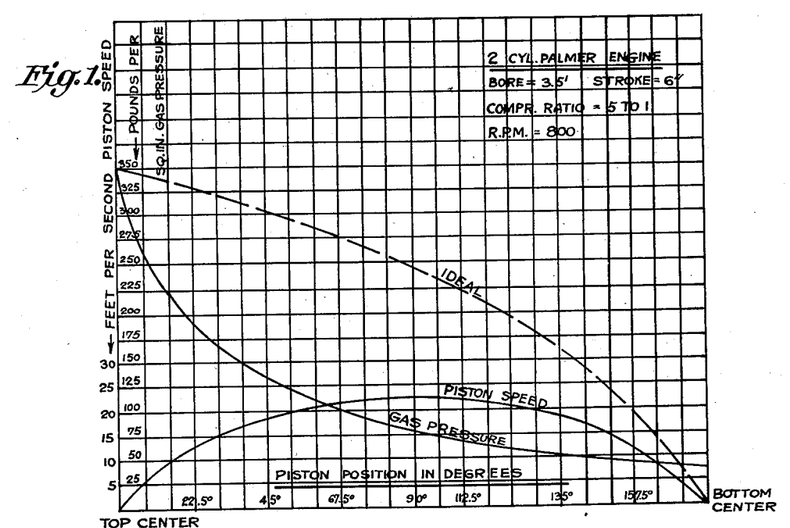

In Fig. 1 there is shown a graph of the piston speed and pressure curve of a given type of engine, and while there are different characteristics to different engines, in the main this graph holds good, for the purpose of this illustration, for almost any type of engine. In examining the graph, it will be found that at the lowest piston speed the highest explosion pressure exists, and while it is permissible to have relatively high pressure at the beginning of the stroke, this position of the piston is very critical, excessive pressure will cause engine vibration, and consequently a loss of very high per cent. of power. Following the curve marked "gas pressure" downward, it is found that it intersects the curve marked "piston speed". The curved marked "ideal" is approximately the proper curve for this engine, maximum or excessive pressure is eliminated and the pressure is sustained in a relation to the piston speed, gradually diminishing, however, due to the expansion of the gases until bottom center of the piston is reached. It is quite obvious that the line marked "gas pressure", which is common to all internal combustion engines of present day design, is radically wrong and to bring it near the ideal, it is necessary to eliminate too fast a burning at a slow piston speed near top center and to accelerate the burning as the piston speed increases after top center.

It is quite apparent that the correction of such an evidently unbalanced condition cannot be accomplished by the shape of the cylinder head, and many other means which have heretofore been suggested, but it can only be accomplished by a continued correction of the chemical condition. By this I mean that the relation of oxygen to combustibles must be corrected during the period of burning, and the spark must be regulated to more nearly correct position. It must be understood that the spark in ordinary practice is set somewhere around thirty-five degrees before top center. This is a compromise and causes development of pressure while the piston ascends, the back pressure incurred in that manner being detrimental to the power development of the engine but the compromise is made on account of the relatively slow burning mixtures now used. In my process, through the addition of auxiliary air and directional turbulence and directional flame propagation, it is not necessary nor desirable to set the spark so early. This eliminates the back pressure on the ascending piston which assists in obtaining more power and better economy. I do not wish to be understood that I do not take into consideration the time required for flame development as the spark is still set somewhat before top center but not nearly as much as heretofore. The spark setting is left of course to the skill of the operator or designer of the engine but comparatively an engine operated without the air injection feature of my invention requires an earlier spark setting than the same engine operated with auxiliary air injection.

The control of flame propagation is accomplished in accordance with my invention by the addition of auxiliary air during the later portion of the compression stroke and during the early part of the combustion stroke. This is on account of the fact that in proportion as the pressure rises, the charge becomes degenerated by the conversion of oxygen into carbon dioxide, and the hydrogen into water. It must be remembered that combustion takes place in an internal combustion engine under pressure, and power development depends upon both the chemical condition and the pressure. My invention corrects the chemical condition at a time when a pressure is still sufficiently high to influence combustion favorably, and in maintaining a more uniform combustion rate, pressure is maintained longer, all of which compounds the results.

Briefly stated, it is a feature of my invention to inject auxiliary air into the cylinder during compression and during initiation of combustion, such air being introduced in jet form and the jet being so directed as to assist flame propagation and to create additional turbulence, all of which permits later spark setting and results in a materially greater power production and a considerable fuel saving.

Figure 2:
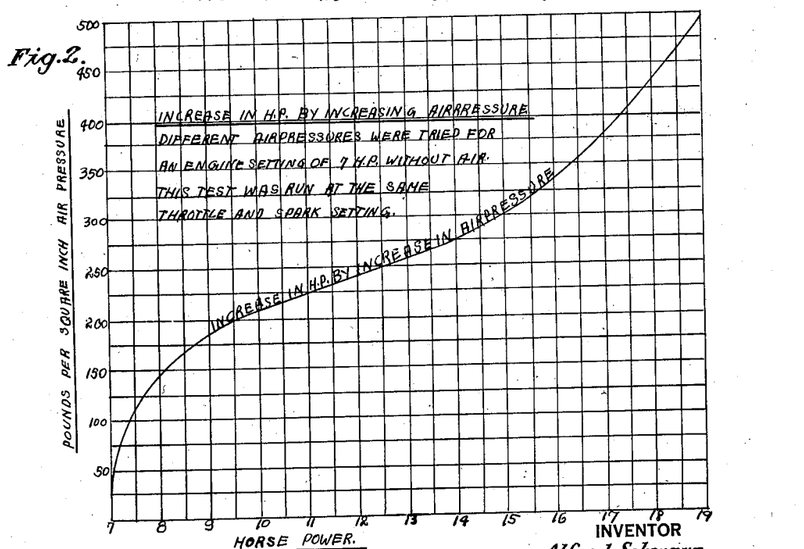

It is, of course, understood that the pressure and volume of the auxiliary air injected have a strong influence upon the results obtained, this being illustrated in Fig. 2. It will be noticed that with gradually rising pressure of the auxiliary air, increased power is obtained with a fixed carburetor setting and throttle opening. At the same time the fuel consumption per H. P. is naturally reduced since the total amount of fuel was the same, but the same was divided by a greater number of H. P. It is also important to notice that the rise in power, after a certain power is reached, is less pronounced. Attention is also called to the fact that engines of different compression naturally require different air pressures and quantity.

While the charts illustrate air pressures used for injection up to 550 pounds, yet it must be remembered that power is required to compress air, that there are limitations thereto, and that there is a point where the power consumed to compress air is greater than the power gained by the use of it. Careful research must be made in designing engines in connection with the air injection principle of my invention to find the most economical air pressure and the most economical volume but I have found that good results are obtainable when the auxiliary air is 30% of the cylinder volume of the engine and 70% of its maximum explosion pressure. This, however, refers only to engines which drive their own compressor and where economy is sought for. Where it is desired, however, that an engine of a given size should produce more power regardless of fuel consumption, a separate compressor unit operated by a separate engine may be used and this falls within the scope of my invention.

Figure 3:
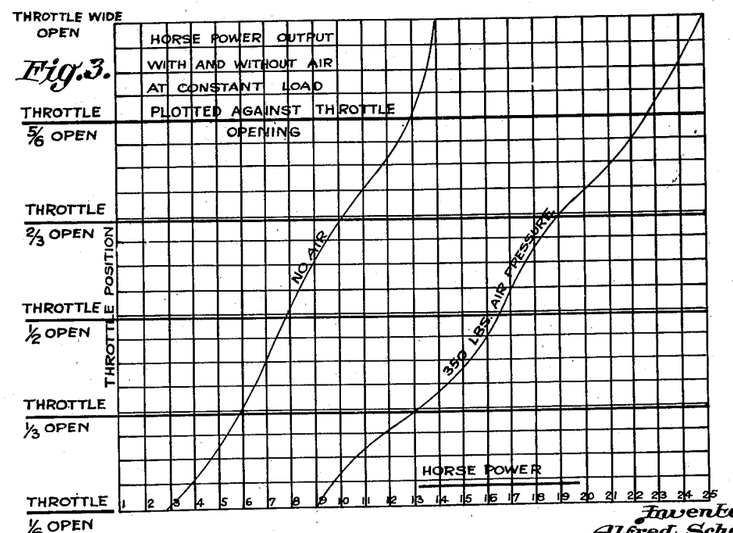
Figure 4:
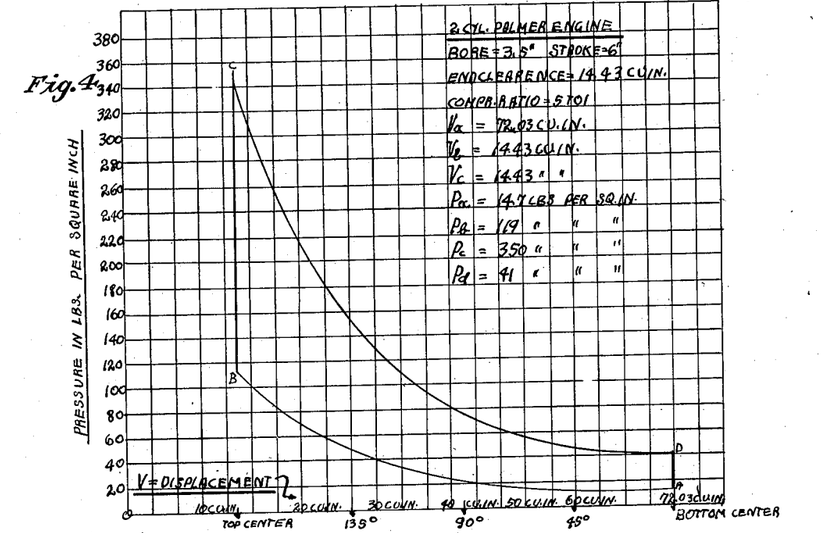

Figure 3 illustrates that when the engine is operated with the throttle partially closed, the H. P. developed is much greater. This is due to the fact that whenever the throttle is partially closed, the intake volume is materially reduced and the engine therefore operates on much less compression, and consequently burning takes place much slower. With auxiliary air injection as above explained, the volume is slightly increased, but mainly the burning is speeded up and therefore more power is derived from the fuel.

The process also lends itself to the use of lower grades of fuel. For example: A gasoline engine may be operated on fuel oil without the usual difficulties. Due to the great heat generated by the auxiliary air jet, the fuel oil is more rapidly converted into gas which results in complete combustion and the delivery of full power, where without air injection a great deal of the fuel would not have been burned, and what was burned would have caused a slow fire not capable of delivering the proper amount of power.

The invention may be applied to any cycle engine. Two cycle, four cycle, or Diesel engines may be equipped with the proper air valves and timing devices to inject the air into the cylinder at the proper time and in proper quantities. Auxiliary pistons, or similar devices may be used to provide the air under proper pressure, and valves may be substituted by port openings without deviating from the invention.

Figures 5, 6:
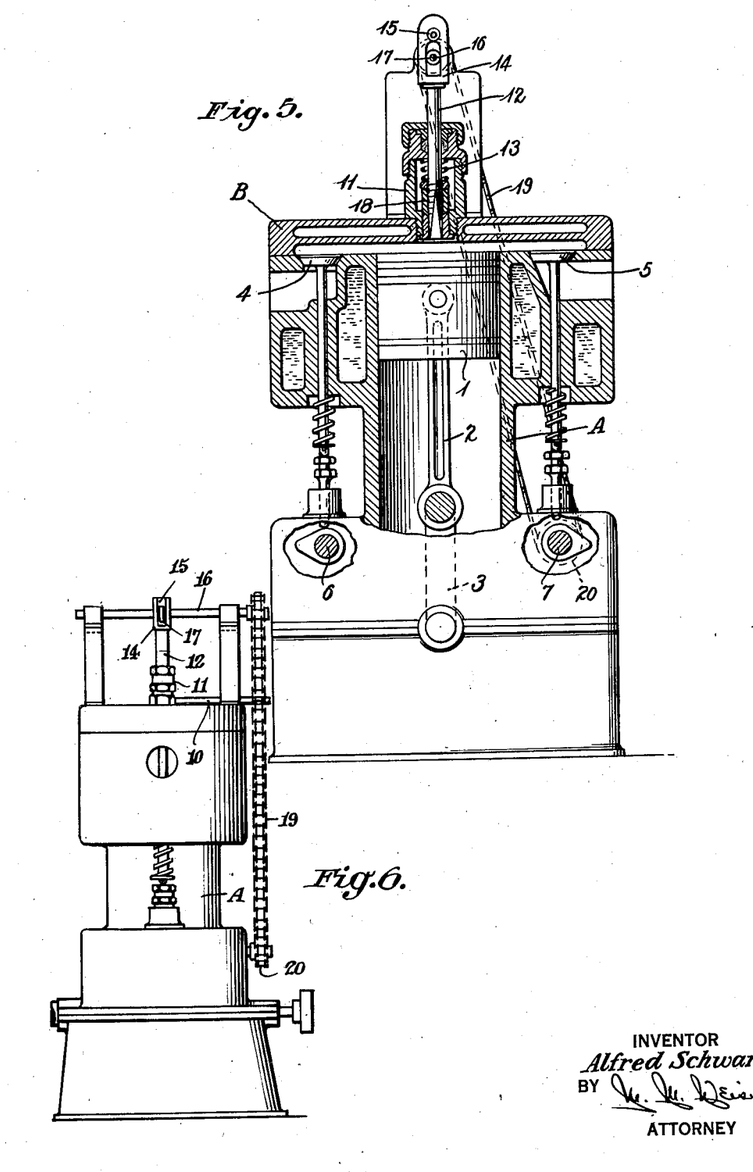
Fig. 5 is a sectional view of an engine designed to carry out my invention and Fig. 6 is a vertical section through the engine.

Many forms of apparatus may be employed to obtain the results as above described, and in Figs. 5 and 6 of the accompanying drawings there is shown one form of the mechanical means which may be employed to carry out the process.

Referring more particularly to Figs. 5 and 6, A indicates an internal combustion engine cylinder operated with air furnished by a separate compressor and power unit. The results obtained in the charts above described were produced by this type of engine. The engine is provided with piston 1, connecting rod 2, and crank 3. The engine is equipped, as usual, with exhaust valve 4 and intake valve 5, the former being operated from exhaust cam shaft 6 and the latter from intake cam shaft 7. The structure thus far referred to is the conventional engine design and per se forms no part of the invention. More detailed description thereof is therefore unnecessary.

As a feature of my invention, a pipe 10 supplies auxiliary air from a suitable compressor (not shown) to an air valve casing 11 in the cylinder head B. The valve stem 12 is normally held in closed position by spring 13 in valve casing 11 and is suspended from member 14 having a roller 15 engaging a cam shaft 16. The latter carries a cam 17 adapted to coact with roller 15 to elevate valve member 18 on stem 12 into open position against the action of spring 13 to admit air to the cylinder from pipe 10. Cam shaft 16 is driven by means of chain 19 from a sprocket 20 on intake cam shaft 7 as shown. Valve member 18 is operated in timed relation to the engine cycle by means of cam shaft 7.

In operation the customary fuel-air mixture is taken into the cylinder through valve 5 and fired in the usual manner by means of a spark plug, not shown. The operation of the valve mechanism in the cylinder head having been properly timed as already explained, additional compressed air is injected to the cylinder A through pipe 10 and casing 11 after the intake valve has closed and during compression and combustion of the fuel mixture. The flame propagation is thus controlled and the combustion intensified in timed relation to the piston movement or speed with the increased operating efficiencies and economies already pointed out.

I am aware of the fact that in Diesel engines air is sometimes used for injecting fuel. This must not be confused with the injection of air without fuel. The mixture of fuel and air is slow burning because it is very rich when injected into Diesel engines. In my invention, on the other hand, fuel and air may be mixed by a suitable carburation device or in any other way, and only air is injected to intensify the burning at given points of the piston position, and this is therefore the inverse of air injection to a Diesel engine.

My invention is also to be distinguished from the use of air for scavenging purposes. In my method of operation, the auxiliary air injection occurs while both the intake and exhaust valves are closed so that the auxiliary air takes part in the compression and combustion only. The exact time of air injection during this interval will, of course, vary with the particular engine design, but, as an example, with an engine firing 10° in advance of top center while compression is being completed, the auxiliary air may be injected 50° in advance of top center.

The amount of auxiliary air to be injected for best results will manifestly vary considerably with the design of the engine and the conditions under which it is operated. However, figured on the piston displacement, the quantitative relationship between the auxiliary aid and the initial fuel-air charge may be about 20% by volume and for most engines auxiliary air in the amount of between 10% and 20% of the total volume of the initial fuel-air mixture will be found to give good results.

As heretofore mentioned, where the engine drives its own compressor, the quantity of air and its pressure must be limited on account of the fact that the power required to compress such air may exceed the gain.

Careful experimentation has shown that the air injection should overlap into the initiation period of the fire so that the turbulence created thereby may benefit the results. When the air was injected too early, the horse-power output was much smaller. Inversely, in order to save the power for air compression, the air should be injected as early as possible because lower air pressures are required. It must be remembered that from the beginning of the compression stroke where the pressure is practically atmospheric, the pressure constantly rises from zero gauge pressure to say 350 lb. maximum explosive pressure. Naturally, if the air is injected during the low pressure period of the compression stroke, but little power is required to compress same, and it is for this reason that it was determined that the air injection should start somewhere near the middle of the compression stroke and end in the beginning of the firing stroke. This will allow moderate consumption of power for air compression and still make the turbulence and directional flow available during flame propagation.

Figure 7:
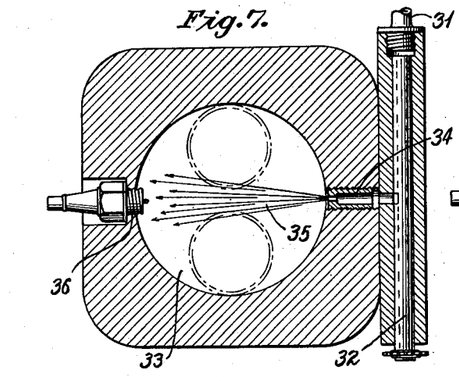
Figs. 7 and 8 are horizontal and vertical sections respectively of a combustion chamber equipped for air injection.
Figure 8:
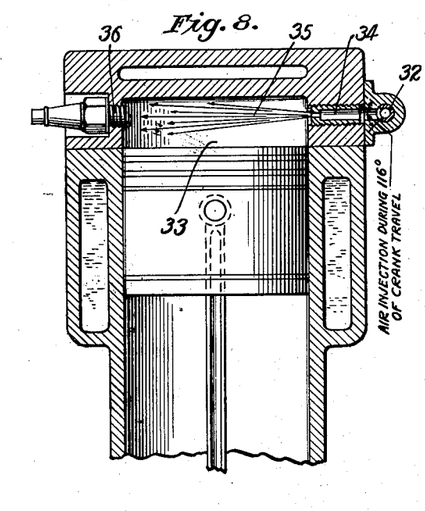

Referring to Figs. 7 to 10 of the drawings, there are shown several jet positions, Fig. 7 showing a cross section horizontally through the combustion chamber and Fig. 8 a cross section vertically through the combustion chamber. The auxiliary air, compressed to say 150 lb. gauge pressure, entered the combustion chamber through connection 31 and was regulated by the timed valve 32 and entered the combustion chamber 33 through the measuring orifice 34. The stream of air indicated at 35 was directed against the spark plug 36. With this arrangement the results were very poor, the engine acted erratic and in the higher power ranges would pre-ignite and die. Investigation showed that some parts, namely, the spark plug terminals, had become red hot and caused the fuel to ignite before the intake valve closed.

Figure 9:
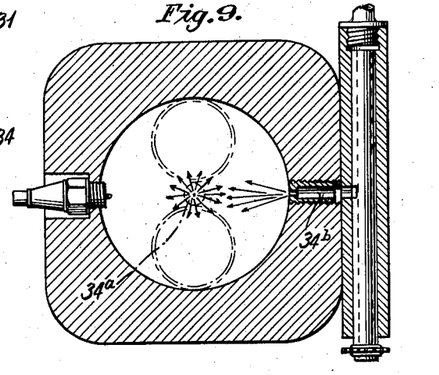
Figs. 9 and 10 are horizontal and vertical sections respectively of a combustion chamber showing a modified form of the air injection.
Figure 10:
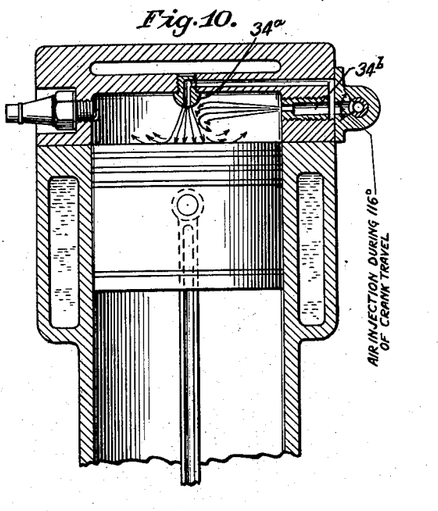

Fig. 9 shows horizontal section of a modified arrangement and Fig. 10 a vertical section thereof. It will be noted that the measuring orifice was divided into two sections 34$^a$ and 34$^b$, the combined circular area of which was equal to the one shown in Fig. 7 but the orifice 34$^a$ was 3/32 inch while the orifice 34$^b$ was 3/64 inch, giving the larger supply at 34$^a$ and the smaller supply at 34$^b$. Orifice 34$^a$ in this modification acted as a protection for the spark plug. A great turbulence was created, uniform mixtures were obtained, and the flame was propagated very rapidly from the point of inception, namely, the spark plug, through the eddy-currents into the not yet ignited fuel and the horse-power and fuel consumption reached by far the best results previously obtained. These results warrant the conclusion that had the air jet been misdirected or used too early or too late, the power gain and fuel economy would not have been obtained. Attention is called to the fact that when the air was directed against the spark plug the terminals became overheated, and it appears quite evident that the stream of air seems to create a blow torch effect thus indicating that such air jets when properly directed will very materially support flame propagation.

Figure 11:
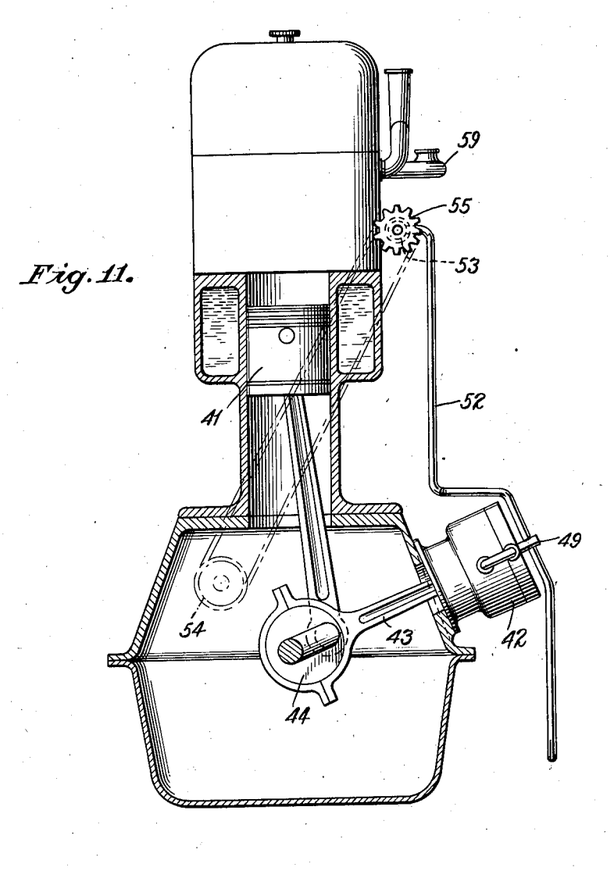
Figure 12:
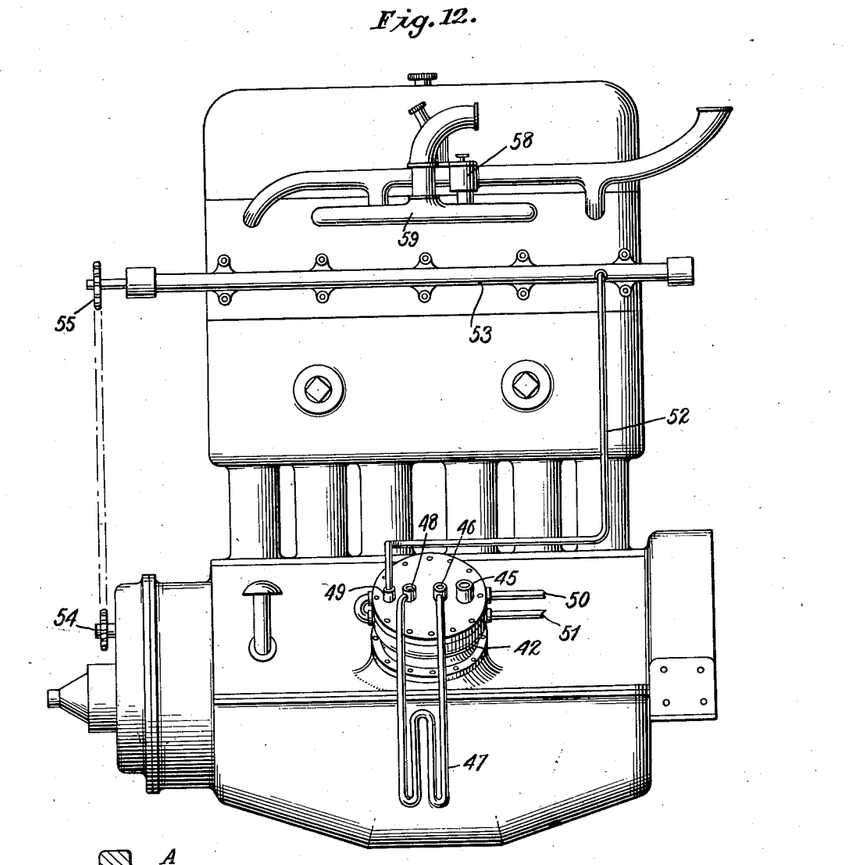
Fig. 12 is a side view thereof.

Figs. 11 and 12 show a typical four-cycle, overhead valve, six-cylinder engine now in use. The engine is of a common type and the intake and exhaust valve mechanism is not shown since all these elements are well known in the art.

Figure 13:
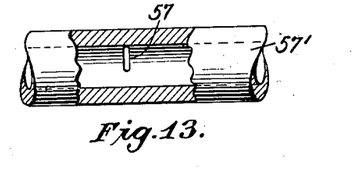
Figure 14:
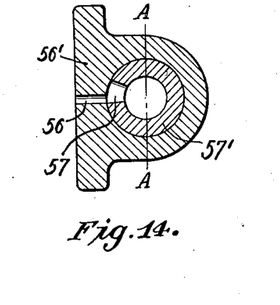
Fig. 14 is a cross section thereof, Fig. 13 being taken on the line A—A of Fig. 14.

Fig. 11 shows a cross section through one cylinder while Fig. 12 shows a side view of the engine. Numeral 41 indicates the piston, 42 the air compressor, 43 the connecting rod of the air compressor, and 44 the eccentric operating the air compressor connecting rod, said eccentric being mounted on the common crank shaft. The air compressor is of the two-stage type and has a low pressure intake valve 45, a low pressure exhaust valve 46, and intercooler 47, an intake valve 48 of the high stage, and an exhaust valve 49 of the high stage. Water pipes 50 and 51 lead to and from a suitable water jacket. The compressed air is taken off at valve 49 and passes through the pipe line 52 to a rotary distributor valve 53. A detail of this distributor valve is shown in Fig. 13 in a longitudial section and in Fig. 14 in a cross section. The valve stem is operated by a timing mechanism indicated at 54 and 55 and the valve rotates distributing the air through orifices 56 of casing 56' in timed relation to the engine cycle and regulated by the length and width of the orifices 56 of rotary sleeve 57'. The carburetor 58 supplies a fuel-air mixture to the engine through intake manifold 59 as is common in all engines of the illustrated type while the compressed air is supplied through the rotary valve 53 as heretofore described.

Figure 15:
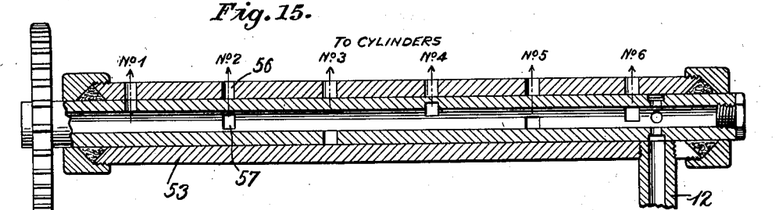
Figure 16:
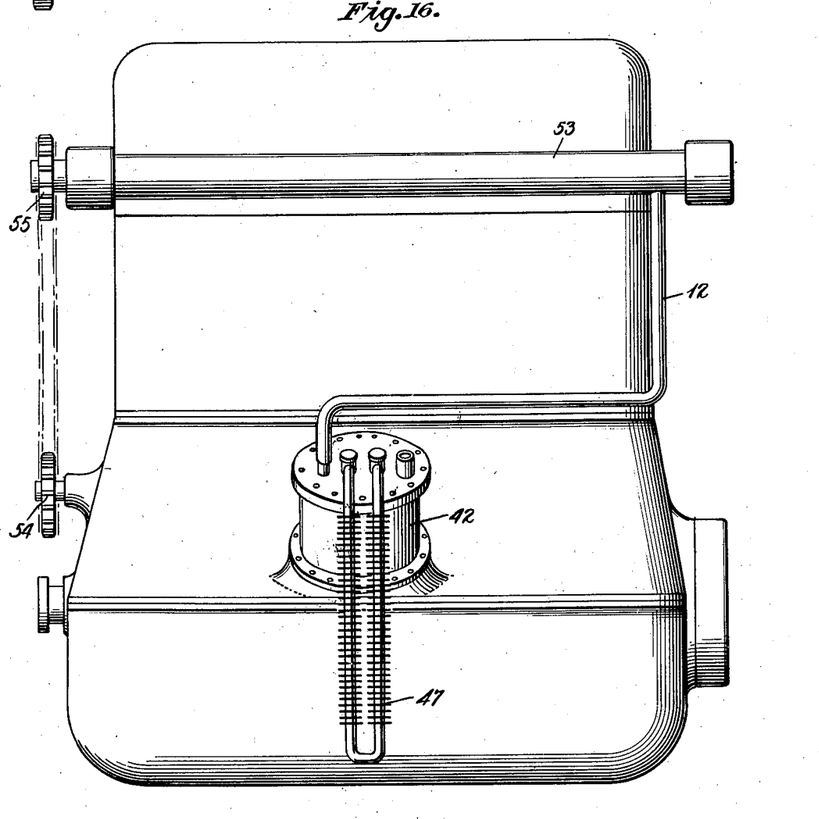
Fig. 16 illustrates its attachment to the cylinder block.

Fig. 15 shows the rotary valve in cross section, the numbers thereon indicating the cylinder numbers to which the different air connections lead. Fig. 16 illustrates how this rotary valve is attached to the cylinder block.

Figures 17, 18, 19:
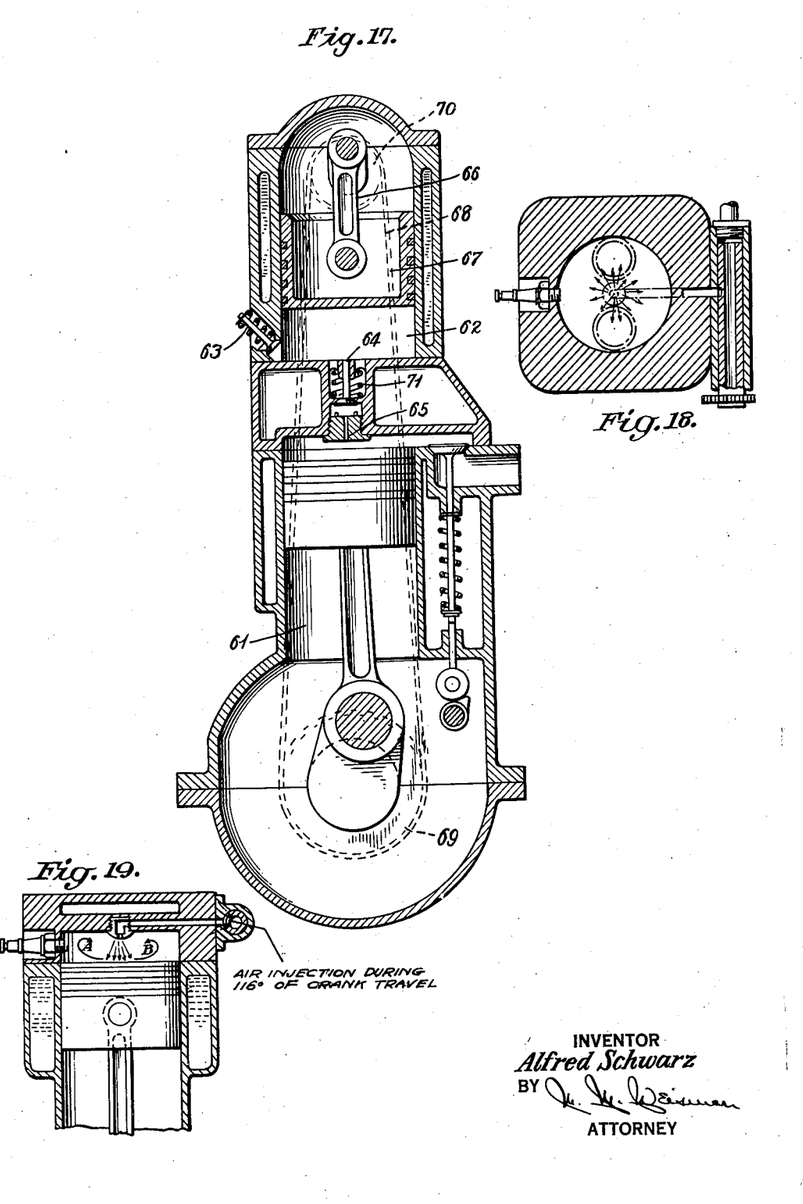
Fig. 17 is a vertical section of a modified engine and auxiliary air compressor combination.
Figs. 18 and 19 show, in plan and vertical section respectively, the path of travel of the auxiliary air.

It is of course understood that the mechanical devices used in connection with my invention are many and it would not be possible to illustrate all of them, but in order to show that such variations can be made without deviating from the spirit of the invention I have shown in Fig. 17 still another form of mechanical device which may be readily used.

Instead of compressing the air in a single unit compressor, each cylinder may have attached to it a secondary cylinder either of smaller diameter or of shorter stroke. In that event no timing valve is required since the air compressor cylinder operates in timed relation with the firing cylinder. Fig. 17 illustrates such a variation. Numeral 61 represents the firing cylinder and 62 the compressor cylinder. It will be noted that the crank of the firing cylinder is of much shorter stroke than the crank of the compressor cylinder. Numeral 63 indicates the air intake valve of the compressor cylinder, 64 the exhaust valve of the compressor cylinder, and 65 the measuring orifice. The latter is relatively small thereby maintaining proper jet velocities. The crank 66 of the compressor piston 67 is driven by a chain 68 with the half time gearing 69 and 70. It will be noted that the compressor cylinder is on top center while the firing cylinder is already past top center, indicating that the air injection time is later than the power stroke. The same timing relation is maintained as hereinbefore described, but in addition to the delay arranged for by the crank, the tension of a spring 71 would cause additional delay on account of the valve only opening when the spring tension is overcome by the air compressor. The net time, however, must be so arranged as to meet the most favorable condition as previously explained. It will be noted that the air is injected in a single jet. This was also experimented with on the engine illustrated in Fig. 12 and gave good results.

The travel of the air injection is illustrated in Figs. 18 and 19. The air currents will assume approximately the motions indicated by the arrows A and B. While it is of course understood that air may be injected to good advantage even when the firing is going on and while the pressure is still sufficient to support combustion (at that period the pressure in the firing cylinder is from 200 to 350 lbs.), in order to create a flow it would be necessary to compress air to approximately 400 lbs. To compress air to 400 lbs. requires so much power that the gain is largely offset.

It is important that the turbulence created by the air injection should still be going on while fire proceeds. The best timing, therefore, for air injection is close to spark, overlapping same until the pressure rises too high and the air flow ceases automatically. It is just as important also that the quantity of air is sufficient to produce the result.

Having described my invention, I claim:

1. In the operation of internal combustion engines wherein a fuel-air mixture is introduced into a cylinder and compressed and ignited therein; the improvement which comprises commencing the injection of additional air to the cylinder after the introduction of the fuel-air mixture thereto and during the compression of the mixture in the cylinder, and continuing such injection of additional air through the completion of the compression and during the initiation of combustion.

2. In the operation of internal combustion engines characterized by a compression stroke upon a fuel-air mixture and the ignition of the compressed mixture in a cylinder; the improvement which comprises introducing auxiliary air to the cylinder at an intermediate portion of the compression stroke and continuing the introduction of auxiliary air during the ignition.

3. In the operation of internal combustion engines wherein a fuel-air mixture is introduced into a cylinder and compressed and ignited therein; the improvement which comprises commencing the injection of additional air to the cylinder after the introduction of the fuel-air mixture thereto and during the compression of the mixture in the cylinder, and continuing such injection of additional air through the completion of the compression and during the initiation of combustion, the additional air being injected in jet form and in a manner to impart substantial turbulence to the materials in the cylinder.

4. In the operation of internal combustion engines characterized by a compression stroke upon a fuel-air mixture and the ignition of the compressed mixture in a cylinder; the improvement which comprises introducing auxiliary air to the cylinder at an intermediate portion of the compression stroke and continuing the introduction of auxiliary air during the ignition, the auxiliary air being introduced in a manner to assist the propagation of flame away from the point of ignition.

5. The process of operating an internal combustion engine comprising introducing a fuel-air mixture to a cylinder, injecting air into said cylinder partially during the compression stroke and in addition thereto during the initial period of firing.

6. In the art of internal combustion engine operation wherein a fuel-air mixture is compressed within a cylinder by upward movement of a piston and the compressed mixture ignited before the piston reaches top center position; the improvement which comprises injecting additional air into the cylinder during compression and also during the initiation of fire.

7. The process of operating an internal combustion engine comprising introducing air into said engine, introducing fuel into said engine and injecting additional air into said engine during the compression stroke, said air being of relatively higher pressure than the mixture being compressed, continuing the injection of said last mentioned air during the initiation of the fire and directing the so introduced air into the cylinder in such a manner as to control flame propagation.

8. A method of operating internal combustion engines characterized in that a fuel-air mixture is compressed and ignited within a cylinder while an influx of air creates a jet of intensified fire originating near the source of ignition, propagating the flame in the direction of unburned fuel.

9. The process of operating an internal combustion engine comprising introducing a fuel-air mixture into a cylinder, injecting auxiliary air before combustion is initiated, firing the charge and continuing the injection of auxiliary air during the initiation of combustion, the total injected auxiliary air being in quantity not more than 30% of the cylinder volume, and limited to a pressure not to exceed 70% of the ultimate maximum explosion pressure of the engine until the air pressure is substantially balanced by the explosion pressure.

10. In combination, a pair of cylinders, a piston reciprocating within each cylinder, means for interconnecting the pistons to reciprocate the same in predetermined timed relations with respect to each other, means for feeding charges of fuel-air mixture into one of the cylinders, means for feeding charges of air into the other cylinder, and means for establishing controlled communication between the said cylinders, said cylinders being timed with respect to each other so that the air from the air compressing cylinder enters the fuel charged cylinder during the compression stroke of the latter and a part thereof during the firing period of said fuel charged cylinder, the point of entry of said air being so located to produce controlled flame propagation, the air compressing cylinder having a displacement of not in excess of 30% of that of the fuel compressing and firing cylinder.

11. In combination, an internal combustion engine having connected thereto an air compressor of a capacity not exceeding 30% of the cylinder displacement of said engine; a distributor and means to conduct compressed air thereto from the compressor; means to conduct said air from the distributor to the engine cylinders, the introduction of the air being timed so that it enters the cylinders during their respective compression strokes and also during the initiation of the fire, said air entering through measuring orifices which are so directed as to produce controlled flame propagation.

12. In combination, an internal combustion engine having a plurality of cylinders, each provided with a piston and intake and exhaust valves operated in timed relation with the piston, a crank shaft for the pistons, an air compressor and means for operating the same from the crank shaft, and a distributor valve having connection with each of the cylinders and the compressor, said valve being operated in timed relation with the engine to inject air from the compressor into each cylinder while the intake and exhaust valves thereof are closed and during a portion of the compression stroke of the piston and during initiation of fire in the cylinder.

13. The process of operating an internal combustion engine comprising introducing a fuel-air mixture to a cylinder, compressing and firing the mixture therein, and injecting air to the cylinder after the intake valve thereof has been closed and during the completion of the compression stroke and the initiation of the fire.

ALFRED SCHWARZ.